(12) United States Patent
Hannu et al.

(10) Patent No.: US 11,743,560 B2
(45) Date of Patent: Aug. 29, 2023

(54) MEDIA DESCRIPTOR FILE COMPRISING A REFERENCE TO OTHER STREAMING MEDIA CONTENT

(71) Applicant: Telefonaktiebolaget LM Ericsson (publ), Stockholm (SE)

(72) Inventors: Hans Hannu, Luleå (SE); Tommy Arngren, Södra Sunderbyn (SE); Peter Ökvist, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/294,742

(22) PCT Filed: Nov. 22, 2018

(86) PCT No.: PCT/EP2018/082255
§ 371 (c)(1),
(2) Date: May 18, 2021

(87) PCT Pub. No.: WO2020/104035
PCT Pub. Date: May 28, 2020

(65) Prior Publication Data
US 2022/0021951 A1    Jan. 20, 2022

(51) Int. Cl.
*H04N 21/8543*  (2011.01)
*H04N 21/84*  (2011.01)
*H04N 21/854*  (2011.01)

(52) U.S. Cl.
CPC ......... *H04N 21/8543* (2013.01); *H04N 21/84* (2013.01); *H04N 21/85406* (2013.01)

(58) Field of Classification Search
CPC ............. H04N 21/84; H04N 21/26603; H04N 21/8543; H04L 67/02; H04L 21/25; H04L 21/23
See application file for complete search history.

(56) References Cited

U.S. PATENT DOCUMENTS

| | | | |
|---|---|---|---|
| 2014/0150019 A1* | 5/2014 | Ma | H04N 21/458 725/34 |
| 2014/0259048 A1 | 9/2014 | Brueck et al. | |
| 2017/0034576 A1* | 2/2017 | Eyer | H04N 21/44008 |
| 2017/0310722 A1* | 10/2017 | Chen | H04L 65/612 |

(Continued)

FOREIGN PATENT DOCUMENTS

EP    1920558 A1    5/2008

OTHER PUBLICATIONS

International Search Report and Written Opinion of the International Searching Authority for PCT International Application No. PCT/EP2018/082255 dated Jan. 21, 2019.

(Continued)

*Primary Examiner* — Caroline H Jahnige
(74) *Attorney, Agent, or Firm* — Sage Patent Group

(57) ABSTRACT

A method is provided for generating a media descriptor file for first streaming media content. The method is performed in a file generator and comprises the steps: obtaining metadata for the first streaming media content, the metadata comprising a reference to a media descriptor file for second streaming media content, the second streaming media content being separate from the first streaming media content; and generating the media descriptor file comprising the metadata.

15 Claims, 3 Drawing Sheets

(56) References Cited

U.S. PATENT DOCUMENTS

2018/0288468 A1* 10/2018 Yamagishi ......... H04N 21/4331
2019/0069004 A1*  2/2019 Badawiyeh ........ H04N 21/2383
2019/0146951 A1*  5/2019 Velmurugan ........... H04L 67/02
                                                            707/822

OTHER PUBLICATIONS

Office Action dated Apr. 21, 2023 for European Patent Application No. 18807962.8, 4 pages.
Sodagar, Iraj et al.; "The MPEG-DASH Standard for Multimedia Streaming Over the Internet"; Industry and Standards, IEEE Multimedia, vol. 18, No. 4; Apr. 1, 2011; pp. 62-67.

* cited by examiner

MEDIA DESCRIPTOR FILE COMPRISING A REFERENCE TO OTHER STREAMING MEDIA CONTENT

CROSS REFERENCE TO RELATED APPLICATION

This application is a 35 U.S.C. § 371 national stage application of PCT International Application No. PCT/EP2018/082255 filed on Nov. 22, 2018, the disclosure and content of which is incorporated by reference herein in its entirety.

BACKGROUND

The present disclosure relates to methods, a file generator, a media player, computer programs and computer program products based on a media descriptor file comprising a reference to other streaming media content.

BACKGROUND

There is a dramatic shift in how media content is consumed. Traditionally, media content has been consumed using broadcast services or physical distribution, such as tapes or discs. When it comes to audio, this implies radio broadcasting and records, CDs (Compact Discs), audio cassettes, etc. When it comes to video (typically combined with audio), this implies television broadcasting and video cassettes, DVDs (Digital Versatile Discs) or Blu-ray discs.

These days, people more and more enjoy on-demand delivery of streaming media content using services such as those provided by YouTube, Netflix, etc. as well as on-demand delivery of streaming media content from traditional broadcast networks.

Each item of streaming media content is often related to other items of streaming media content. In order to allow a media player to provide the ability for a user to activate such related streaming media content, a database needs to be maintained. In the database, each such item of streaming media content can be associated with other items of streaming media content.

Maintaining such a database is cumbersome and demands particular infrastructure, particularly for smaller providers of streaming media content. It would be of great benefit if the maintenance of metadata for streaming media content could be simplified.

SUMMARY

It is an object to provide a way to link from one item of streaming media content to another, without the need for maintaining a database.

According to a first aspect, it is provided a method for generating a media descriptor file for first streaming media content. The method is performed in a file generator and comprises the steps of: obtaining metadata for the first streaming media content, the metadata comprising a reference to a media descriptor file for second streaming media content, the second streaming media content being separate from the first streaming media content; and generating the media descriptor file comprising the metadata.

The metadata may comprise a reference to a media descriptor file for third streaming media content.

The metadata may comprises a reference to text data to be presented by a media player as a human readable description of the first streaming media content.

The media descriptor file may be in XML, Extensible Markup Language, format.

The media descriptor file may be a media presentation description file for use with DASH, Dynamic Adaptive Streaming over HTTP, Hypertext Transfer Protocol.

The media descriptor file may be an M3U8, Moving Picture Experts Group Audio Layer 3 Uniform Resource Locator UTF, Unicode Transformation Format, 8, file for use with HLS, HTTP Live Streaming.

The step of generating the media descriptor file may comprise including a reference type, in the media descriptor file, in association with each reference to a media descriptor file.

Each reference type may be one of previous streaming media content, next streaming media content, parent streaming media content, child streaming media content, and alternative version of streaming media content.

According to a second aspect, it is provided a file generator for generating a media descriptor file for first streaming media content. The file generator comprises: a processor; and a memory storing instructions that, when executed by the processor, cause the file generator to: obtain metadata for the first streaming media content, the metadata comprising a reference to a media descriptor file for second streaming media content, the second streaming media content being separate from the first streaming media content; and generate the media descriptor file comprising the metadata.

The metadata may comprise a reference to a media descriptor file for third streaming media content.

The metadata may comprise a reference to text data to be presented by a media player as a human readable description of the first streaming media content.

The media descriptor file may be in XML, Extensible Markup Language, format.

The media descriptor file may be a media presentation description file for use with DASH, Dynamic Adaptive Streaming over HTTP, Hypertext Transfer Protocol.

The media descriptor file may be an M3U8, Moving Picture Experts Group Audio Layer 3 Uniform Resource Locator UTF, Unicode Transformation Format, 8, file for use with HLS, HTTP Live Streaming.

The instructions to generate the media descriptor file may comprise instructions that, when executed by the processor, cause the file generator to: include a reference type, in the media descriptor file, in association with each reference to a media descriptor file.

Each reference type may be one of previous streaming media content, next streaming media content, parent streaming media content, child streaming media content, and alternative version of streaming media content.

According to a third aspect, it is provided a computer program for generating a media descriptor file for first streaming media content. The computer program comprises computer program code which, when run on a file generator causes the file generator to: obtain metadata for the first streaming media content, the metadata comprising a reference to a media descriptor file for second streaming media content, the second streaming media content being separate from the first streaming media content; and generate the media descriptor file comprising the metadata.

According to a fourth aspect, it is provided a computer program product comprising a computer program according to the third aspect and a computer readable means on which the computer program is stored.

According to a fifth aspect, it is provided a method for interpreting a media descriptor file for first streaming media content, the method being performed in a media player and comprising the steps of: obtaining the media descriptor file comprising metadata for the first streaming media content, the metadata comprising a reference to a media descriptor file for second streaming media content, the second streaming media content being separate from the first streaming media content; and generating a user interface element which, when activated, loads the second streaming media content using the reference to the media descriptor file for the second streaming media content.

The metadata may comprise a reference to a media descriptor file for third streaming media content and wherein the step of generating a user interface element comprises generating an additional user interface element which, when activated, loads the third streaming media content using the reference to the media descriptor file for the third streaming media content.

The metadata may comprise a reference to text data; in which case the method further comprises the step of: presenting the text data as a human readable description of the first streaming media content using the reference to text data.

The media descriptor file may be in XML, Extensible Markup Language, format.

The media descriptor file may be a media presentation description file for use with DASH, Dynamic Adaptive Streaming over HTTP, Hypertext Transfer Protocol.

The media descriptor file may be an M3U8, Moving Picture Experts Group Audio Layer 3 Uniform Resource Locator UTF, Unicode Transformation Format, 8, file for use with HLS, HTTP Live Streaming.

The media descriptor file may comprise a reference type in association with each reference to a media descriptor file, in which case each user interface element reflects the reference type.

Each reference type may be one of previous streaming media content, next streaming media content, parent streaming media content, child streaming media content, and alternative version of streaming media content.

According to a sixth aspect, it is provided a media player for interpreting a media descriptor file for first streaming media content. The media player comprises: a processor; and a memory storing instructions that, when executed by the processor, cause the media player to: obtain the media descriptor file comprising metadata for the first streaming media content, the metadata comprising a reference to a media descriptor file for second streaming media content, the second streaming media content being separate from the first streaming media content; and generate a user interface element which, when activated, loads the second streaming media content using the reference to the media descriptor file for the second streaming media content.

The metadata may comprise a reference to a media descriptor file for third streaming media content, in which case the instructions to generate a user interface element comprise instructions that, when executed by the processor, cause the media player to generate an additional user interface element which, when activated, loads the third streaming media content using the reference to the media descriptor file for the third streaming media content.

The metadata comprises a reference to text data, in which case the media player further comprises instructions that, when executed by the processor, cause the media player to: present the text data as a human readable description of the first streaming media content using the reference to text data.

The media descriptor file may be in XML, Extensible Markup Language, format.

The media descriptor file may be a media presentation description file for use with DASH, Dynamic Adaptive Streaming over HTTP, Hypertext Transfer Protocol.

The media descriptor file may be an M3U8, Moving Picture Experts Group Audio Layer 3 Uniform Resource Locator UTF, Unicode Transformation Format, 8, file for use with HLS, HTTP Live Streaming.

The media descriptor file may comprise a reference type in association with each reference to a media descriptor file; in which case each user interface element reflects the reference type.

Each reference type may be one of previous streaming media content, next streaming media content, parent streaming media content, child streaming media content, and alternative version of streaming media content.

According to a seventh aspect, it is provided a computer program for interpreting a media descriptor file for first streaming media content. The computer program comprises computer program code which, when run on a the media player causes the media player to: obtain the media descriptor file comprising metadata for the first streaming media content, the metadata comprising a reference to a media descriptor file for second streaming media content, the second streaming media content being separate from the first streaming media content; and generate a user interface element which, when activated, loads the second streaming media content using the reference to the media descriptor file for the second streaming media content.

According to an eighth aspect, it is provided a computer program product comprising a computer program according to the seventh aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein are based on the realisation that the media descriptor file of streaming media content can be used to efficiently provide references to related streaming media content. In this way, the references to related streaming media do not need to be maintained in an external database. Moreover, the process of generating the media descriptor file fixes the references, thereby giving control over the references at the time that the media descriptor file is generated.

Figure 1:
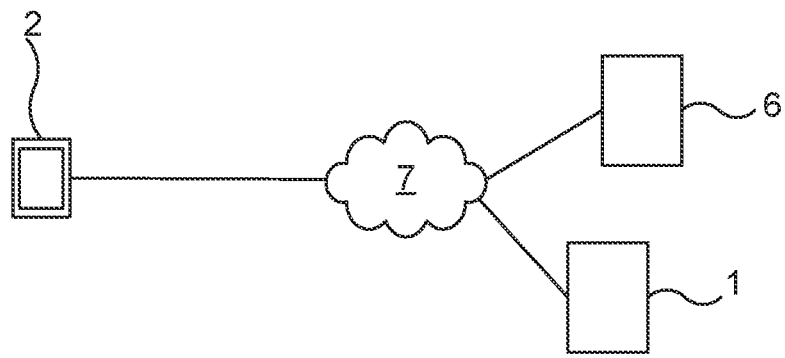
FIG. 1 is a schematic diagram illustrating an environment in which embodiments presented herein can be applied.

FIG. 1 is a schematic diagram illustrating an environment in which embodiments presented herein can be applied.

A streaming media server 6 is a server which provides streaming media content to one or more media players 2 via a communication network 7. Each media player can be any suitable electronic device capable of communicating via the communication network and that is capable of rendering streaming media content from the streaming media server 6. For instance, the media player 6 can be embodied as a wearable device, a smartphone, a tablet computer, a laptop computer, a desktop computer, a television, a set top box, etc.

The streaming media server 6 can e.g. be based on DASH (Dynamic Adaptive Streaming over HTTP (Hypertext Transfer Protocol)), HLS (HTTP Live Streaming). In DASH and HLS, an item of streaming media content is split into smaller consecutive chunks, giving flexibility in media delivery, while allowing the streaming media content to be delivered using established transfer protocols, such as HTTP.

A file generator 1 is provided, which generates a media descriptor file containing relevant metadata for each item of streaming media content. In particular, the media descriptor file can comprise references to the chunks of streaming media content to allow a player to play the streaming media content. The file generator 1 is here shown separate from the streaming media server 6, but these two devices can optionally be combined in a single physical device.

The delivery of streaming media can occur using a media distribution network (not shown). Nevertheless, in one way or another, the media player 2 first obtains the media descriptor file when an item of streaming media content is to be played, in order to know from where to obtain the chunks of streaming media content and when.

The communication network 7 can be of any suitable type and can e.g. be based on the Internet and/or cellular networks, such as any one or a combination of 5G NR (New Radio), LTE (Long Term Evolution), LTE Advanced, W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable.

According to embodiments presented herein, the media descriptor file also contains one or more references to related streaming media content.

Figure 2:
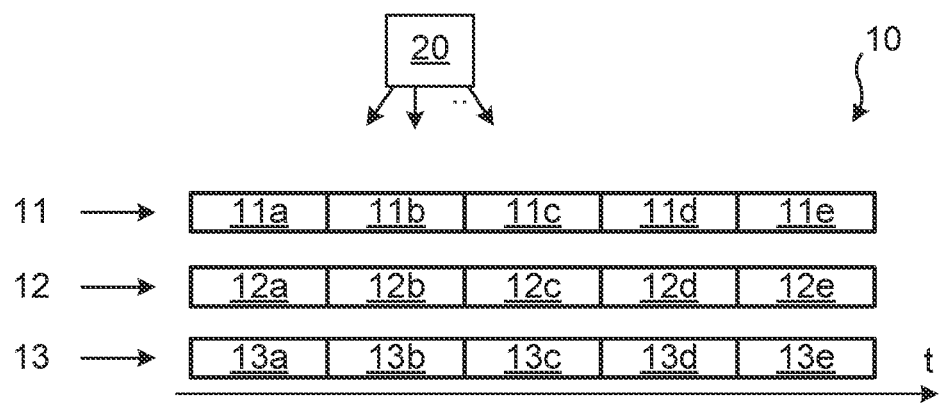
FIG. 2 is a schematic diagram illustrating components of streaming media content.

FIG. 2 is a schematic diagram illustrating components of streaming media content 10. Time flows from left to right.

The streaming media content 10 comprises different types of content in the form of video content 11, audio content 12 and subtitle content 13. Each one of the types of content is split in time into chunks according to the description above. For instance, the video content 11 is split into video chunks 11a-11e. Analogously, the audio content 12 is split into audio chunks 12a-e and the subtitle content 13 is split into subtitle chunks 13a-e.

A media descriptor file 20 contains references to each one of the video chunks 11a-11e, the audio chunks 12a-12e and the subtitle chunks 13a-13e. These references allows the media player to first obtain the media descriptor file 20, after which the media player knows what chunks to get and when.

It is to be noted that each item of streaming media content may contain many more chunks than those shown in the illustratory example of FIG. 2.

Moreover, there may be several variants (not shown) of the same content type. For instance there can be several variants of the video content 11, for different bitrates and/or resolutions. The player can then switch between the different variants of the video content at chunk borders, e.g. based on currently available bandwidth, to maximise quality based on available bandwidth.

Figure 3:
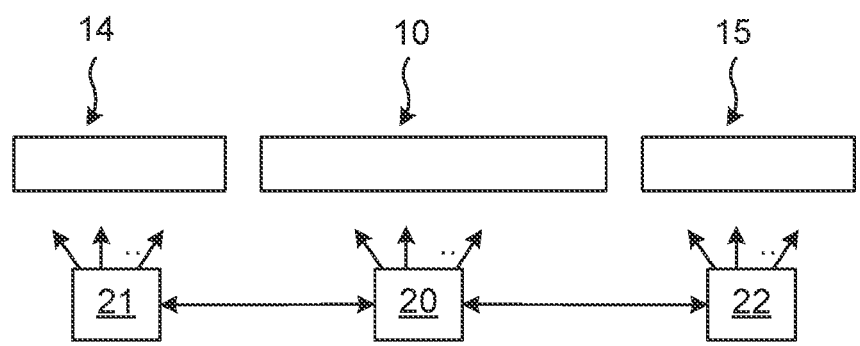
FIG. 3 is a schematic diagram illustrating relationship between media descriptors and several instances of streaming media content.

FIG. 3 is a schematic diagram illustrating relationship between media descriptors and several instances of streaming media content.

Here, there are three items of streaming media content shown: a first streaming media content 10, a second streaming media content 14 and a third streaming media content 15. Each streaming media content contains one or more content types, e.g. as those shown in FIG. 2 and described above.

A first media descriptor file 20 is associated with the first streaming media content 10 and contains i.a. references to chunks of media of the first streaming media content 10.

A second media descriptor file 21 is associated with the second streaming media content 14 and contains i.a. references to chunks of media of the second streaming media content 14.

A third media descriptor file 22 is associated with the third streaming media content 15 and contains i.a. references to chunks of media of the third streaming media content 15.

According to embodiments presented herein, the media descriptor file contains one or more references to other streaming media content. In this example, the first media descriptor file 20 contains a reference to the second media descriptor file 21 (and thus implicitly to the second streaming media content 14) and a reference to the third media descriptor file 22 (and thus implicitly to the third streaming media content 15). It is to be noted that the second media descriptor file 21 and the third media descriptor file, in turn, may contain references to related streaming media content. The references between media content are here mutual, i.e. the second media descriptor file 21 also contains a reference to the first media descriptor file 20 and the third media descriptor file 22 contains a reference to the first media descriptor file 20.

The reference to streaming media content can be one of several different reference types.

One reference type is previous streaming media content. This implies that the previous streaming media content is streaming media content that is in some way before in time compared to the streaming media content associated with the media descriptor file containing the reference. For instance, the previous streaming media content could have been recorded before in time (e.g. before in a before and after transformation, such as for a house renovation or a makeover), or can be a previous episode in a series of episodes.

One reference type is next streaming media content. This implies that the next streaming media content is streaming media content that is in some way after in time compared to the streaming media content associated with the media descriptor file containing the reference. For instance, the next streaming media content could have been recorded after in time (e.g. after in a before and after transformation, such as for a house renovation or a makeover), or can be a next episode in a series of episodes.

One reference type is parent streaming media content. This implies that the parent streaming media content is streaming media content that in some way is of a higher hierarchy nature. For instance, the parent streaming media content can be streaming media content of which the streaming media content associated with the media descriptor file containing the reference is only a small part, e.g. a clip.

One reference type is child streaming media content, being the reverse of the parent streaming media content described above. In other words, the child streaming media content is in some way of a lower hierarchy nature. For instance, the child streaming media content can be streaming media content which is a small part, e.g. a trailer or a clip, of the streaming media content associated with the media descriptor file containing the reference.

One reference type is alternative version of streaming media content. For instance, the alternative version can be in another view angle or a director's cut, etc.

One reference type is related streaming media content. The related streaming media content can be any type of related media content which does not fit in with the reference types described above.

Figure 4:
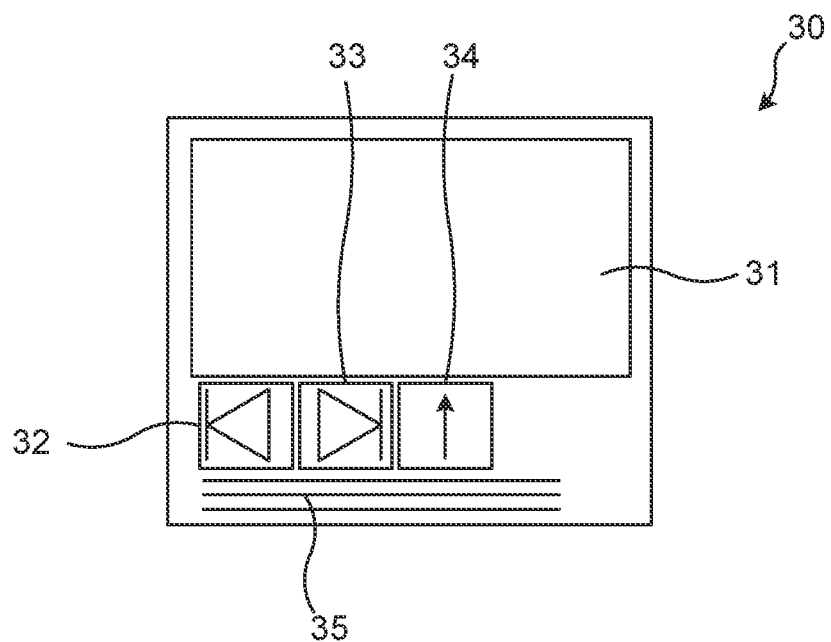
FIG. 4 is a schematic diagram illustrating a user interface of the media player of FIG. 1 according to one embodiment.

FIG. 4 is a schematic diagram illustrating a user interface 30 of the media player of FIG. 1 according to one embodiment. According to embodiments presented herein, the inclusion of reference to other media descriptor files, as exemplified above, enable such references to be associated with buttons in the user interface 30, allowing a user to easily navigate between linked media content.

The user interface 30 contains a main display element 31 in which video content of the streaming media content is rendered. There are also a number of user interface elements 32-34. In this embodiment, there is a previous button 32, a next button 33 and an up button 34. The user interface 30 can be based on a touch screen interface and/or a traditional display with a pointer device (such as a mouse, trackpad or directional keys) or any other suitable user interface.

The previous button 32 allows, when activated, a user to load streaming media content which is referenced in the currently active media descriptor file and which is of the reference type previous streaming media content.

The next button 33 allows, when activated, a user to load streaming media content which is referenced in the currently active media descriptor file and which is of the reference type next streaming media content.

The up button 32 allows, when activated, a user to load streaming media content which is referenced in the currently active media descriptor file and which is of the reference type parent streaming media content.

A text area 35 is used to present text data being associated with the current streaming media content.

Figure 5:
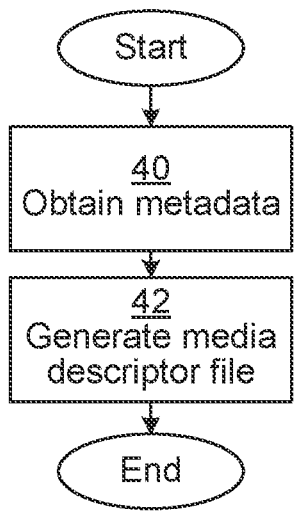
FIG. 5 is a flow chart illustrating embodiments of methods for generating a media descriptor file.

FIG. 5 is a flow chart illustrating embodiments of methods for generating a media descriptor file. The method is performed in the file generator. The file generator can form part of a video editing program, which can be configured to include references to related media content when the media descriptor file is generated. Alternatively, the file generator can form part of a media content manager program, allowing a user to define relationships between various instances of media content.

In an obtain metadata step 40, the file generator obtains metadata for the first streaming media content. The metadata comprising a reference to a media descriptor file for second streaming media content, where the second streaming media content is separate from the first streaming media content. The reference can be in the form of a URI (Uniform Resource Indicator). The metadata also comprises all other applicable metadata which is known in the art per se, e.g. references to media chunks of the first streaming media content.

Optionally, the metadata comprises a reference to a media descriptor file for third streaming media content. The metadata can comprise references to any suitable number of instances of streaming media content.

Furthermore, the metadata can comprise a reference to text data to be presented by a media player as a human readable description of the first streaming media content. The text data does not need to be human readable per se, but the reference and the text data need to enable the media player to determine the human readable description based on the reference and/or the text data. In one embodiment, the reference is in the form of a URI and the text data is Unicode text. In one embodiment, the text data comprises machine readable instructions directing a media player to present desired text data.

In a generate media descriptor file step 42, the file generator generates the media descriptor file comprising the metadata. The media descriptor file can be in any suitable format. For instance, the media descriptor file can be in XML (Extensible Markup Language) format. More specifically, the media descriptor file can be a media presentation description file (MPD) for use with DASH.

Here now follows an example illustrating how the three references can form part of an XML file, such as an MPD file.

<MediaInformation>
<previous>
xlink:href="http://foo.com/prevScene123.xsd"
</previous>
<next>
xlink:href="http://foo.com/nextScene123.xsd"
</next>
<parent>
xl-ink:href="http://foo.com/parentMedia123.xsd"
</parent>
</MediaInformation>

The MediaInformation tag can form part of an MPD file on the highest level under the MPD tag. Under the MediaInformation tag, there can be one or more reference type tags. In this example, there are three reference types, each represented by a separate tag. The reference type previous is represented by a previous tag. The reference type next is represented by a next tag and the reference type parent is represented by a parent tag. Within each reference type tag (in this example, previous, next, and parent), there is a link to the associated media descriptor file.

Additionally, here follows an example illustrating how the reference to text data can form part of an XML file, such as an MPD file.

<RelationInformation>
<notes>
xlink:href="http://foo/myDescription123.txt"
</notes>
</RelationInformation>

The RelationInformation tag can form part of an MPD file on the highest level under the MPD tag. Under the RelationInformation tag, there is here a notes tag, in which a reference to text data is provided. In one embodiment, the reference to text data is directly under the RelationInformation tag, removing the need for the notes tag.

In one embodiment, the media descriptor file is an M3U8 (Moving Picture Experts Group Audio Layer 3 Uniform Resource Locator UTF (Unicode Transformation Format) 8) file for use with HLS. The M3U8 is equivalent to the MPD file, but in plain text format.

In one embodiment, this step comprises including a reference type, in the media descriptor file, in association with each reference to a media descriptor file. For instance, each reference type can be any one of previous streaming media content, next streaming media content, parent streaming media content, child streaming media content, alternative version of streaming media content and related streaming media content, as described above with reference to FIG. 3.

Figure 6A:
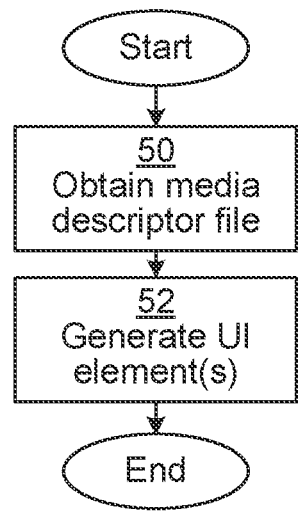
FIGS. 6A-B are flow charts illustrating embodiments of methods for interpreting a media descriptor file.
Figure 6B:
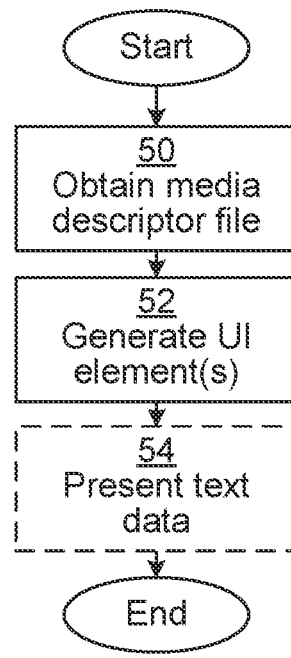

FIGS. 6A-B are flow charts illustrating embodiments of methods, performed in the media player, for interpreting a media descriptor file. The media descriptor file is of the type that is generated in step 42 of the method illustrated in FIG. 5 and mentioned above.

In an obtain media descriptor file step 50, the media player obtains the media descriptor file comprising metadata for the first streaming media content. This step obtains a media descriptor file having been generated in step 42 described above. Hence, the metadata (of the media descriptor file) comprises a reference to a media descriptor file for second streaming media content. The second streaming media content is separate from the first streaming media content. As described in more detail below, the reference allows the media player to present a user interface element to enable a user to navigate to the second media content, e.g. in a sequence of media content.

The media descriptor file can be in any suitable format. For instance, the media descriptor file can be in XML format. More specifically, the media descriptor file can be an MPD file for use with DASH. In one embodiment, the media descriptor file is an M3U8 file for use with HLS.

In one embodiment, this step comprises including a reference type, in the media descriptor file, in association with each reference to a media descriptor file. For instance, each reference type can be any one of previous streaming media content, next streaming media content, parent streaming media content, child streaming media content, and alternative version of streaming media content, as described with reference to FIG. 3 above.

In a generate UI element(s) step 52, the media player generates a user interface element which, when activated, loads the second streaming media content using the reference to the media descriptor file for the second streaming media content. Examples of such user interface elements are user interface elements 32-34 of FIG. 4, described above.

The metadata can comprises a reference to a media descriptor file for third streaming media content. In such a case, an additional user interface element is generated. The additional user interface element, when activated, loads the third streaming media content using the reference to the media descriptor file for the third streaming media content. For instance a previous button (see 32 in FIG. 4) can be associated with the reference to the second streaming media content and a next button (see 33 in FIG. 4) can be associated with the reference to the third streaming media content.

Looking now to FIG. 6B, only new or modified steps compared to the method of FIG. 6A will be described.

In an optional present text data step 54, the media player presents text data as a human readable description of the first streaming media content using the reference to text data. The text data is obtained using the metadata, which in this case, comprises a reference to the text data. The text data can be presented in a text area in the user interface (see 35 in FIG. 4).

Figure 7:
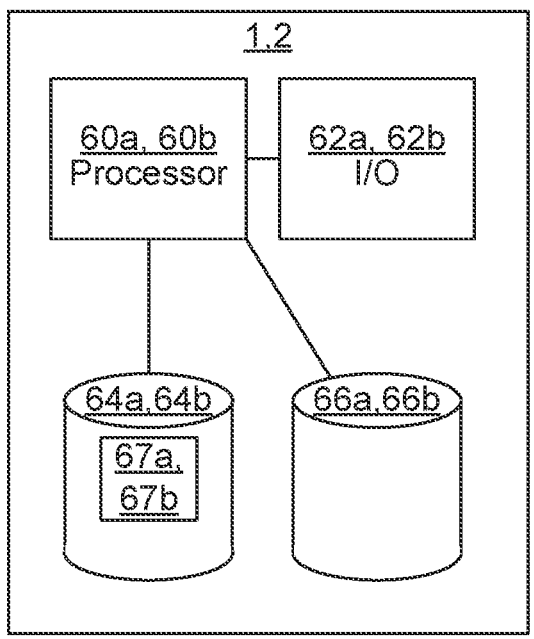
FIG. 7 is a schematic diagram illustrating components of each one of the network node, user device of FIG. 1.

FIG. 7 is a schematic diagram illustrating components of each one of the file generator 1 and media player 2 of FIG. 1. In FIG. 7, all reference numerals ending with 'a', i.e. 60*a*, 62*a*, 64*a*, 66*a*, 67*a*, form part of the file generator 1. All reference numerals ending with 'b', i.e. 60*b*, 62*b*, 64*b*, 66*b*, 67*b* form part of the media player 2. A respective processor 60*a*, 60*b* is provided using any combination of one or more of a suitable central processing unit (CPU), multiprocessor, microcontroller, digital signal processor (DSP), etc., capable of executing respective software instructions 67*a*, 67*b* stored in a respective memory 64*a*, 64*b*, which can thus be a computer program product. The processor 60*a*, 60*b* could alternatively be implemented using an application specific integrated circuit (ASIC), field programmable gate array (FPGA), etc. The processor 60*a* of the file generator 1 is configured to execute embodiments of the method described above with reference to FIG. 5. The processor 60*b* of the media player 2 is configured to execute embodiments of the method described above with reference to FIGS. 6A-B.

The memory 64*a*, 64*b* can be any combination of random access memory (RAM) and/or read only memory (ROM). The memory 64*a*, 64*b* also comprises persistent storage, which, for example, can be any single one or combination of magnetic memory, optical memory, solid-state memory or even remotely mounted memory.

A respective data memory 66*a*, 66*b* is also provided for reading and/or storing data during execution of software instructions in the processor 60*a*, 60*b*. The data memory 66*a*, 66*b* can be any combination of RAM and/or ROM.

An respective I/O interface 62*a*, 62*b* is provided for communicating with external and/or internal entities. Optionally, the I/O interface 62*a*, 62*b* also includes a user interface. At least the I/O interface 62*b* of the media player 2 comprises a user interface.

Other components of the file generator 1 and the media player 2 are omitted in order not to obscure the concepts presented herein.

Figure 8:
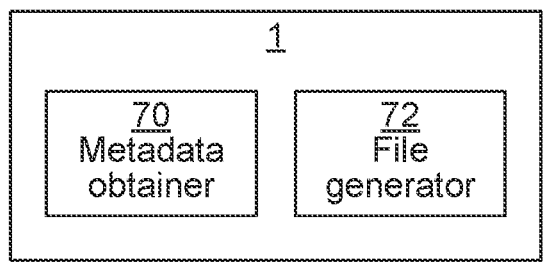
FIG. 8 is a schematic diagram showing functional modules of the file generator of FIG. 1 according to one embodiment.

FIG. 8 is a schematic diagram showing functional modules of the file generator 1 of FIG. 1 according to one embodiment. The modules are implemented using software instructions such as a computer program executing in the file generator 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 5.

A metadata obtainer 70 corresponds to step 40. A file generator 72 corresponds to step 42.

Figure 9:
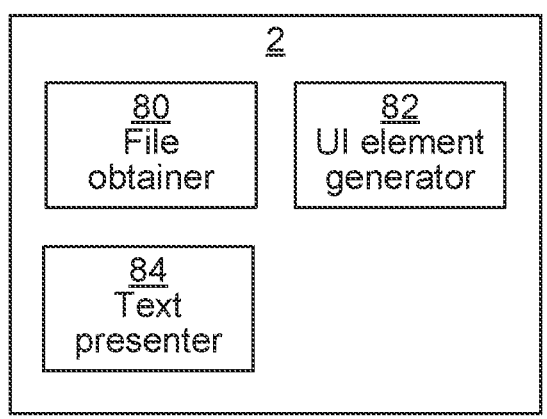
FIG. 9 is a schematic diagram showing functional modules of the media player of FIG. 1 according to one embodiment.

FIG. 9 is a schematic diagram showing functional modules of the media player 2 of FIG. 1 according to one embodiment. The modules are implemented using software instructions such as a computer program executing in the media player 2. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 6A-B.

A file obtainer corresponds to step 50. A UI (User Interface) element generator 82 corresponds to step 52. A text presenter 84 corresponds to step 54.

Figure 10:
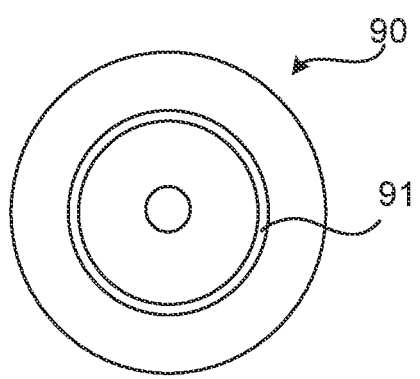
FIG. 10 shows one example of a computer program product comprising computer readable means.

FIG. 10 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64a, 64b of FIG. 7. While the computer program 91 is here schematically shown as a track on the depicted optical disk, the computer program can be stored in any way which is suitable for the computer program product, such as a removable solid state memory, e.g. a Universal Serial Bus (USB) drive.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A file generator for generating a first media descriptor file for first streaming media content, the file generator comprising:
   a processor; and
   a memory storing instructions that, when executed by the processor, cause the file generator to perform operations comprising:
   obtaining metadata for the first streaming media content, the metadata comprising a plurality of references to a plurality of further media descriptor files for further streaming media contents, the plurality of further streaming media contents each being separate from the first streaming media content, wherein the plurality of references to the plurality of further media descriptor files are in association with a plurality of reference types, wherein the plurality of reference types comprise previous streaming media content, next streaming media content, parent streaming media content, and child streaming media content; and
   generating the first media descriptor file comprising the metadata.

2. The file generator according to claim 1, wherein the metadata comprises a reference to text data to be presented by a media player as a human readable description of the first streaming media content.

3. The file generator according to claim 1, wherein each media descriptor file is in XML, Extensible Markup Language, format.

4. The file generator according to claim 3, wherein each media descriptor file is a media presentation description file for use with DASH, Dynamic Adaptive Streaming over HTTP, Hypertext Transfer Protocol.

5. The file generator according to claim 1, wherein the plurality of reference types further comprise alternative version of streaming media content.

6. A method for interpreting a first media descriptor file for first streaming media content, the method being performed in a media player and comprising the steps of:
   obtaining the first media descriptor file comprising metadata for the first streaming media content, the metadata comprising a plurality of references to a plurality of further media descriptor files for a plurality of further streaming media contents, the plurality of further streaming media contents each being separate from the first streaming media content, wherein the plurality of references to the plurality of further media descriptor files are in association with a plurality of reference types, wherein the plurality of reference types comprise previous streaming media content, next streaming media content, parent streaming media content, and child streaming media content; and
   generating a plurality of user interface elements which, when activated, load the plurality of further streaming media contents using the plurality of references to the plurality of further media descriptor files for the plurality of further streaming media contents.

7. The method according to claim 6, wherein the metadata comprises a reference to text data; and wherein the method further comprises the step of:
   presenting the text data as a human readable description of the first streaming media content using the reference to text data.

8. The method according to claim 6, wherein each media descriptor file is in XML, Extensible Markup Language, format.

9. The method according to claim 8, wherein each media descriptor file is a media presentation description file for use with DASH, Dynamic Adaptive Streaming over HTTP, Hypertext Transfer Protocol.

10. The method according to claim 6, wherein the plurality of user interface elements reflect the plurality of reference types.

11. The method according to claim 6, wherein the plurality of reference types further comprise alternative version of streaming media content.

12. A media player for interpreting a first media descriptor file for first streaming media content, the media player comprising:
   a processor; and
   a memory storing instructions that, when executed by the processor, cause the media player to perform operations comprising:
   obtaining the first media descriptor file comprising metadata for the first streaming media content, the metadata comprising a plurality of references to a plurality of further media descriptor files for a plurality of further streaming media contents, the plurality of further streaming media contents each being separate from the first streaming media content, wherein the plurality of references to the plurality of further media descriptor files are in association with a plurality of reference types, wherein the plurality of reference types comprise previous streaming media content, next streaming media content, parent streaming media content, and child streaming media content; and generating a plurality of user interface elements which, when activated, load the plurality of further streaming media contents using the plurality of references to the plurality of further media descriptor files for the plurality of further streaming media contents.

13. The media player according to claim 12, wherein the metadata comprises a reference to text data, and wherein the media player further comprises instructions that, when executed by the processor, cause the media player to:

present the text data as a human readable description of the first streaming media content using the reference to text data.

14. The media player according to claim 12, wherein the plurality of user interface elements reflect the plurality of reference types.

15. The media player according to claim 12, wherein the plurality of reference types further comprise alternative version of streaming media content.

\* \* \* \* \*